C. B. F. TINGLEY.
Machines for Threading Bolts.
No. 154,813. Patented Sept. 8, 1874.
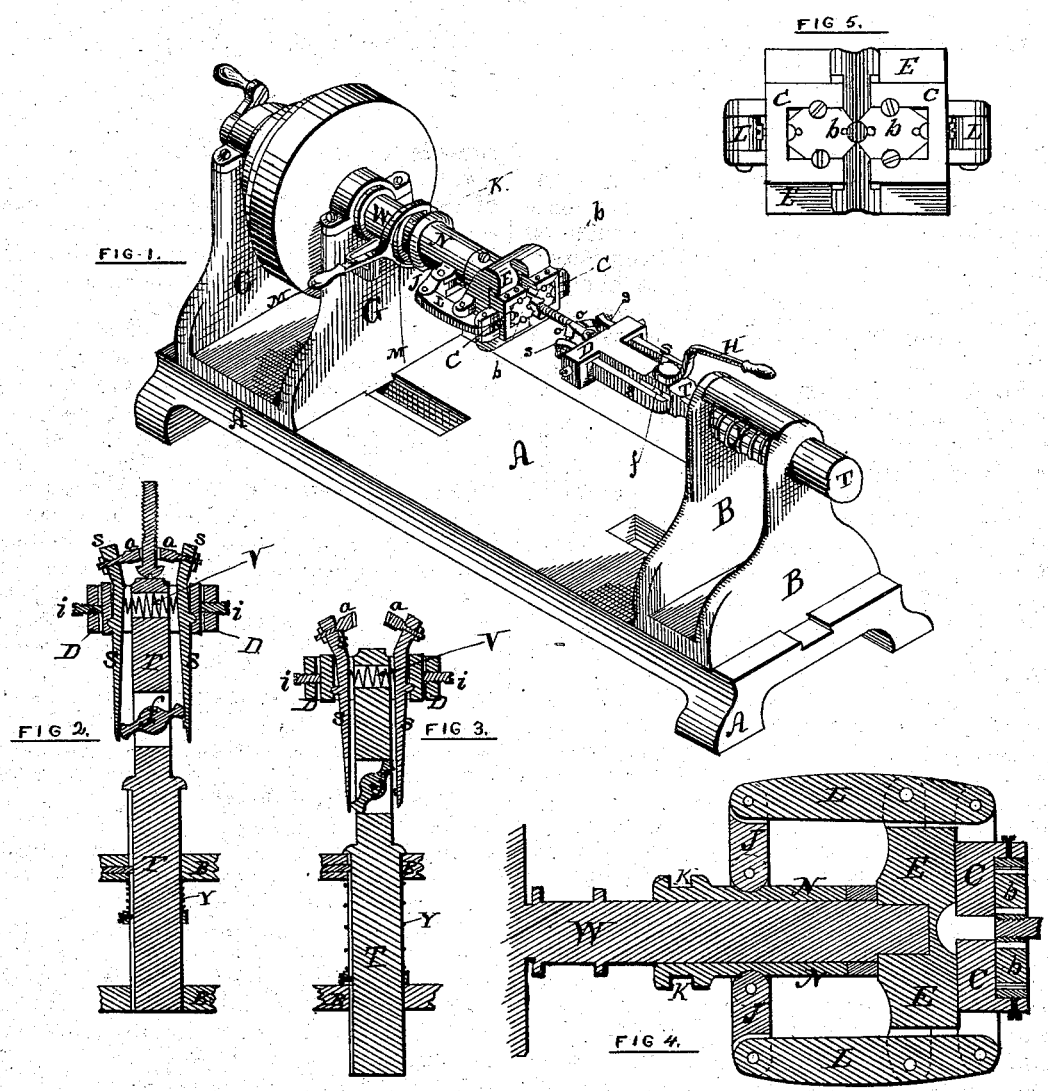
WITNESSES.
Orrin L. Bosworth
John B. Grinnell
INVENTOR.
Cyrus B. F. Tingley

UNITED STATES PATENT OFFICE.

CYRUS B. F. TINGLEY, OF PAWTUCKET, RHODE ISLAND.

IMPROVEMENT IN MACHINES FOR THREADING BOLTS.

Specification forming part of Letters Patent No. 154,813, dated September 8, 1874; application filed January 29, 1874.

*To all whom it may concern:*

Be it known that I, CYRUS B. F. TINGLEY, of Pawtucket, in the county of Providence and State of Rhode Island, have invented an Improvement in Machines for Cutting Screw-Threads on Bolts, &c., of which the following is a specification, referring to the accompanying drawing, making part of the same, in which—

Figure 1 is a perspective view of my improved bolt-cutting machine. Fig. 2 is a longitudinal section of the parts which hold the bolt to be threaded, showing the bolt so held. Fig. 3 is a like view of the same preparatory to receiving the bolt or screw to be threaded. Fig. 4 is a cross-section of the screw-cutting parts. Fig. 5 is a front view of the screw-cutting dies and their holders or die-blocks and the cross-head in which they slide.

Similar letters mark like parts in all the figures.

The object of my invention, as practically attained, is the construction of a machine with which the required service of cutting threads on bolts, &c., may be executed as rapidly and economically as on any pre-existing machine of the general class to which it belongs, and at the same time to increase its capacity for execution, by reducing to a minimum the consumption of the time of the operative and of the machine in the attendant operations of clamping and releasing the blank from its holder and from the cutting-dies, and of advancing the bolt to and withdrawing it from said cutting-dies, it being a well-known fact that a considerable proportion of the whole time necessary for cutting the screw-threads on bolts in such machines is consumed in the operations of setting the bolt in the clamps, securing it therein, and advancing it to and from the screw-cutting dies.

The apparatus for griping and holding the bolt firmly by its shank is mounted in the "tail-stock" B of the machine, Fig. 1, and the apparatus for cutting the thread on the bolts by means of "matched dies" is mounted in the head-stock G of said machine, the said head and tail-stock being adjustable with reference to each other on the bed A of the machine. The said apparatus for holding the bolt or screw firmly by its shank to have screw-threads cut upon it consists of a pair of jaws, $a$ $a$, in the forward-projecting ends of a pair of levers, S S, that are confined so as to form a fulcrum for each in the cross-head D forming part of the spindle T in the tail-stock of the machine, with which levers also in said cross-head is arranged a spring, V, for pressing the forward ends of the levers S S asunder to admit the bolt, or release it from the jaws, as the case may be, and two set-screws, $i$ $i$, are provided in the opposite ends of the cross-head to adjust the position of the jaws to the size or diameter of the bolt to be threaded. These levers S S are actuated to compress the jaws $a$ $a$ on the bolt or screw by their longer rear ends, to which the two-armed cam $f$ is applied, and the force exerted therewith by a hand-lever, H, by swinging which on the pivot of the arms or cam $f$ the latter is turned crosswise between, and thus made to spread the long rear ends of the levers S S apart, and the forward ends of the same with the jaws $a$ $a$ together, and to maintain the same easily in this position, with the effect of a firm and unyielding gripe, and holding of the bolt or screw-blank by any part of its shank, the said mechanism furnishing the means of griping and exerting an unusually powerful force for holding the bolt or screw for cutting a screw-thread upon it with extreme ease and quickness of action, and of maintaining such hold without a continuous exercise of manual force during the operation of threading. The jaws $a$ $a$ are removable from the levers S for readily supplying others of varying sizes, and the whole apparatus slides horizontally in the tail-stock B toward the threading apparatus as the thread-cutting is progressing, and is brought to the position for repeating the same by the spiral spring Y, or like device on the spindle T. The threading apparatus consists of a pair of threading-dies, $b$ $b$, held in two die-blocks, C C, which are fitted to slide accurately in the cross-head E on or forming part of the spindle W of the head-stock G; and these dies are set up with unusual force and precision of movement by a pair of levers, L L, that connect the two die-blocks to the cross-head E, and a pair of toggle-joints, J J, to a sliding sleeve, N, provided with a groove, K, for the application of a forked hand-lever, M, thereto, with which to slide the sleeve for the adjustment of the dies, while the spindle and cross-head carrying said dies are rapidly rotating, the longitudinal movement of the sleeve and the toggle-joints having the effect to spread the rear ends of the levers L asunder, and press the forward ends and die-blocks together, and compress the bolt equally between both threading-dies while rotating, and by that means cut an even and perfect screw-thread thereon.

The operation of cutting the thread can be repeated a number of times until the full thread of the requisite diameter is produced, but a single cut of the threading-dies is usually found sufficient.

By the arrangement, in combination of the die-blocks, with the cross-head and connecting-levers, the two dies have an equal and positive movement with reference to the object to be threaded, by means of which greater regularity and accuracy of cutting are secured; and the combination of the hand-lever sleeve and toggle-joints with the said connecting-levers constitutes a mechanism that is capable of exerting an unusual power upon said die-blocks by the application of a comparatively slight manual force on the hand-lever M, with the advantage of maintaining the force without continued exertion by the arrangement in connection of the toggle-joints and levers, as shown and described.

The operation of my machine is as follows: The operative, standing in front of the machine, with his left hand places a blank in the griping-jaws S S and by swinging the hand-lever H toward himself, effects the proper holding of the bolt, and by a continued pressure on said lever in the same direction, the holding-jaw slide is moved toward the dies, which are continuously revolving. As soon as the dies take hold on the bolt, they draw it toward them without much if any assistance from the operative until the proper length of thread is cut, when, with the left hand of the operative, the lever M is thrown back and the cutting-dies opened, which operation is promptly followed by the automatic withdrawal of the spindle with the bolt, the backward action being promptly induced by the retractile spring Y, which overcomes the inertia of the slide in the tail-stock. A single backward movement of the lever H releases the bolt, and another blank is inserted, as before, and so on, the operations of setting, advancing, withdrawing, and discharging the bolt being fully as rapidly effected as that of cutting the thread, it being unnecessary for the operative at any time to remove his right hand from the lever H. When several cuts of the dies are to be made in order to make a full thread, the bolt, after retraction, as described, is again advanced, with the hand still on the releasing and advancing lever, until completed.

I am aware that dies have been heretofore constructed and operated in the manner herein shown, and that pivoted and sliding jaws, closed and held by a vertical lever, which, when thrown in a direction away from the dies, would, by its presence, either spread their rear ends or bring two sliding jaws together, and by that means compress the blank between their holding faces, and that such jaws have been thrown backward from the dies by means of springs. I therefore make no claim thereto; but I do claim as my invention—

1. The improved holding device composed of the spindle T, in combination with head D, adjusting-screws $i$ $i$, levers S S, jaws $a$ $a$, spring $v$, cam $f$, and lever H, as described.

2. In combination with screw-cutting dies, the improved clamping and delivering device, constructed substantially as described, provided with the lever H, arranged to swing toward the dies in clamping a bolt, and to be used by the operative in delivering the bolt to the screw-cutting dies, substantially as described.

CYRUS B. F. TINGLEY.

Witnesses:
ORRIN L. BOSWORTH,
JOHN B. GRINNELL.